(12) United States Patent
Blacher et al.

(10) Patent No.: US 11,170,019 B1
(45) Date of Patent: Nov. 9, 2021

(54) DATA FIELD TRANSACTION REPAIR INTERFACE

(71) Applicant: Wells Fargo Bank, N.A., San Francisco, CA (US)

(72) Inventors: Seth M. Blacher, San Francisco, CA (US); Karin L. Farnsworth, Glen Allen, VA (US); Kellie L. Thomas, St. Johns, FL (US); Irvin J. Cooper, Columbia Heights, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1092 days.

(21) Appl. No.: 14/876,182

(22) Filed: Oct. 6, 2015

(51) Int. Cl.
| | | |
|---|---|---|
| *G06F 7/00* | (2006.01) | |
| *G06F 16/25* | (2019.01) | |
| *G06F 3/0484* | (2013.01) | |
| *G06F 40/205* | (2020.01) | |

(52) U.S. Cl.
CPC ........ *G06F 16/254* (2019.01); *G06F 3/04842* (2013.01); *G06F 40/205* (2020.01)

(58) Field of Classification Search
CPC .... G06Q 20/02; G06Q 20/023; G06Q 10/067; G06F 40/205; G06F 16/254; G06F 3/04842
USPC ............... 705/30, 40, 44; 707/781, 802, 803
See application file for complete search history.

(56) References Cited

U.S. PATENT DOCUMENTS

| | | | |
|---|---|---|---|
| 6,016,482 A * | 1/2000 | Molinari | G06Q 20/10 |
| | | | 705/35 |
| 6,223,168 B1 | 4/2001 | McGurl et al. | |
| 6,882,983 B2 | 4/2005 | Furphy et al. | |
| 7,006,994 B1 | 2/2006 | Campbell et al. | |
| 7,181,420 B2 | 2/2007 | Gonen-friedman et al. | |
| 7,693,791 B2 | 4/2010 | Hahn-carlson et al. | |
| 7,725,335 B1 | 5/2010 | Goodwin | |
| 7,734,545 B1 | 6/2010 | Fogliano et al. | |
| 7,792,688 B2 * | 9/2010 | Yanak | G06Q 10/00 |
| | | | 705/2 |
| 7,792,746 B2 | 9/2010 | Del et al. | |
| 7,865,411 B2 | 1/2011 | Stone et al. | |
| 7,865,413 B2 | 1/2011 | Furphy et al. | |
| 7,925,551 B2 | 4/2011 | Hahn-carlson et al. | |
| 8,224,724 B2 | 7/2012 | Dubey et al. | |
| 8,326,754 B2 | 12/2012 | Bandych et al. | |
| 8,571,985 B1 | 10/2013 | Grigg et al. | |
| 8,600,885 B2 | 12/2013 | Hoffman | |
| 9,406,097 B1 | 8/2016 | Piety | |
| 9,449,312 B1 | 9/2016 | Wilson et al. | |

(Continued)

OTHER PUBLICATIONS

US 10,949,817 B1, 03/2021, Blacher et al. (withdrawn)

(Continued)

*Primary Examiner* — Md I Uddin

(74) *Attorney, Agent, or Firm* — Schwegman Lundberg & Woessner, P.A.

(57) ABSTRACT

A method may include receiving a data file comprising receivable information associated with at least one transaction; detecting that the data file fails to conform to a defined format; separating the receivable information into a plurality of fields; receiving input identifying remittance information in the plurality of fields; reformatting the data file according to the input into a reformatted data file; and transmitting the reformatted data file for processing of the remittance information.

12 Claims, 10 Drawing Sheets

(56) References Cited

U.S. PATENT DOCUMENTS

| | | |
|---|---|---|
| 9,659,284 B1 | 5/2017 | Wilson et al. |
| 9,734,490 B1 | 8/2017 | Wilson et al. |
| 9,740,900 B1 | 8/2017 | Wilson et al. |
| 9,978,068 B2 | 5/2018 | Butterfield et al. |
| 10,115,082 B1 | 10/2018 | Wilson et al. |
| 10,147,082 B1 | 12/2018 | Wilson et al. |
| 10,311,412 B1 | 6/2019 | Josephs et al. |
| 10,410,191 B2 | 9/2019 | Ceribelii et al. |
| 10,417,674 B2 | 9/2019 | Ceribelli et al. |
| 10,540,655 B2 | 1/2020 | Chase et al. |
| 10,891,605 B1 | 1/2021 | Wilson et al. |
| 2003/0158811 A1 | 8/2003 | Sanders et al. |
| 2004/0064375 A1 | 4/2004 | Randell et al. |
| 2005/0060261 A1 | 3/2005 | Remington et al. |
| 2005/0182721 A1 | 8/2005 | Weintraub |
| 2006/0041487 A1 | 2/2006 | Santaio et al. |
| 2007/0127597 A1 | 6/2007 | Ammer et al. |
| 2007/0265887 A1 | 11/2007 | Mclaughlin et al. |
| 2008/0021822 A1 | 1/2008 | Hinton et al. |
| 2008/0109256 A1 | 5/2008 | Christen |
| 2009/0083179 A1 | 3/2009 | Gustave et al. |
| 2009/0112658 A1 | 4/2009 | Mullen et al. |
| 2009/0112662 A1 | 4/2009 | Mullen et al. |
| 2009/0244600 A1 | 10/2009 | Haycock et al. |
| 2009/0326974 A1* | 12/2009 | Tolan ................ G06Q 10/04 705/2 |
| 2011/0258004 A1 | 10/2011 | Dean et al. |
| 2012/0047112 A1* | 2/2012 | Steffan ............ G06F 17/30011 707/662 |
| 2014/0006297 A1 | 1/2014 | Hogg et al. |
| 2014/0222669 A1 | 8/2014 | Novak et al. |
| 2014/0244491 A1 | 8/2014 | Eberle et al. |
| 2014/0282977 A1 | 9/2014 | Madhu et al. |
| 2016/0104133 A1 | 4/2016 | Davis et al. |
| 2018/0349776 A1 | 12/2018 | Raamadhurai et al. |
| 2019/0039241 A1 | 12/2019 | Ceribelli et al. |
| 2019/0378183 A1 | 12/2019 | Lowell et al. |
| 2020/0184281 A1 | 6/2020 | Le et al. |
| 2020/0265326 A1 | 8/2020 | Shah et al. |
| 2020/0265393 A1 | 8/2020 | Shah et al. |
| 2020/0265443 A1 | 8/2020 | Shah et al. |
| 2020/0410562 A1 | 12/2020 | Balasubramanian et al. |

OTHER PUBLICATIONS

"U.S. Appl. No. 15/257,461, Advisory Action dated Sep. 21, 2020", 4 pgs.

"U.S. Appl. No. 15/257,461, Decision on Pre-Appeal Brief dated Nov. 6, 2020", 2 pgs.

"U.S. Appl. No. 15/257,461, Final Office Action dated Feb. 21, 2019", 39 pgs.

"U.S. Appl. No. 15/257,461, Final Office Action dated Jul. 9, 2020", 20 pgs.

"U.S. Appl. No. 15/257,461, Non Final Office Action dated Jan. 24, 2020", 45 pgs.

"U.S. Appl. No. 15/257,461, Non Final Office Action dated May 31, 2018", 29 pgs.

"U.S. Appl. No. 15/257,461, Notice of Allowance dated Apr. 6, 2021", 5 pgs.

"U.S. Appl. No. 15/257,461, Notice of Allowance dated Nov. 16, 2020", 20 pgs.

"U.S. Appl. No. 15/257,461, Pre-Appeal Brief filed Oct. 9, 2020", 4 pgs.

"U.S. Appl. No. 15/257,461, Response filed Apr. 24, 2020 to Non Final Office Action dated Jan. 24, 2020", 16 pgs.

"U.S. Appl. No. 15/257,461, Response filed May 21, 2019 to Final Office action dated Feb. 21, 2019", 17 pgs.

"U.S. Appl. No. 15/257,461, Response filed Sep. 9, 2020 to Final Office Action dated Jul. 9, 2020", 17 pgs.

"U.S. Appl. No. 15/257,461, Response filed Oct. 31, 2018 to Non Final Office Action dated May 31, 2018", 17 pgs.

\* cited by examiner

REVIEW THAT THE REMITTANCE DATA WAS LOADED INTO THE DATA TABLE PROPERLY. CONTINUE IF CORRECT OR EDIT TABLE RULES IF THE INFORMATION DOES NOT FIT IN THE TABLE CORRECTLY

REMITTANCE INFORMATION FOR 24,100 USD ACH FROM SUPPLY COMPANY

|   | COLUMN 1 | COLUMN 2 | COLUMN 3 | COLUMN 4 | COLUMN 5 | COLUMN 6 |
|---|---|---|---|---|---|---|
| 1 | ZS | ASSOCIATES | INV | R5290 | USD | 10,100 |
| 2 | ZS | ASSOCIATES | INV | R5291 | USD | 2,000 |
| 3 | ZS | ASSOCIATES | INV | R5292 | USD | 4,000 |
| 4 | ZS | ASSOCIATES | INV | R5293 | USD | 8,000 |

EDIT TABLE RULES

PREVIOUS    NEXT

REVIEW THE ORIGINAL, UNFORMATTED REMITTANCE INFORMATION AND ANSWER THE FOLLOWING QUESTIONS:

502 — ARE THERE COLUMN HEADERS OR LABELS AT THE TOP OF THE INFORMATION?
○ YES  ○ NO

504 — ARE THERE COLUMN FOOTERS OR TOTALS AT THE BOTTOM OF THE INFORMATION?
○ YES  ○ NO

506 — HOW MANY REMITTANCE ITEMS (INVOICES, ACCOUNTS, ETC) DO YOU SEE WITHIN THE REMITTANCE INFORMATION?
○ ONE  ○ MORE THAN ONE

508 — HOW MANY LINES DO EACH OF THESE REMITTANCE ITEMS TAKE?
○ [1 LINE ▽]
○ DOES NOT APPLY TO THIS REMITTANCE

510 — WHAT IS THE FORMAT OF THE REMITTANCE INFORMATION
○ FIXED LENGTH
○ SEPARATED BY: [SELECT ▽]

512 —
| ZS | ASSOCIATES | INV | R5290 | USD | 10,100 |
| ZS | ASSOCIATES | INV | R5291 | USD | 2,000 |
| ZS | ASSOCIATES | INV | R5292 | USD | 4,000 |
| ZS | ASSOCIATES | INV | R5293 | USD | 8,000 |

[ SAVE CHANGES ]   [ CANCEL ]

FIG. 5

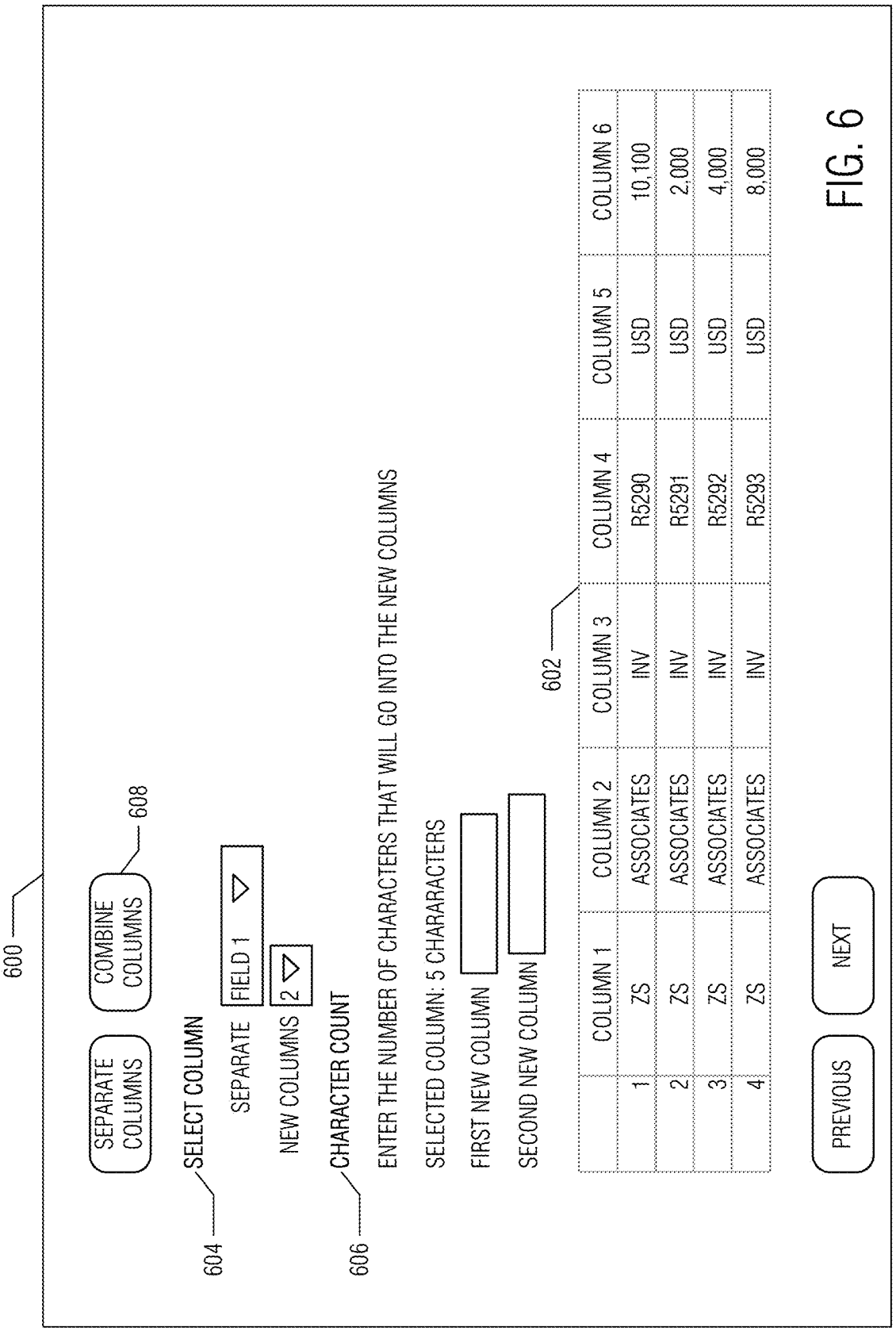

CHOOSE FIELD PROFILE

FIELD PROFILE: JANE'S PROFILE

LABEL THE COLUMNS YOU NEED

- COLUMN 1 — IGNORE THIS FIELD ▷
- COLUMN 2 — IGNORE THIS FIELD ▷
- COLUMN 3 — IGNORE THIS FIELD ▷
- COLUMN 4 — IGNORE THIS FIELD ▷
- COLUMN 5 — IGNORE THIS FIELD ▷
- COLUMN 6 — IGNORE THIS FIELD ▷

| | COLUMN 1 | COLUMN 2 | COLUMN 3 | COLUMN 4 | COLUMN 5 | COLUMN 6 |
|---|---|---|---|---|---|---|
| 1 | ZS | ASSOCIATES | INV | R5290 | USD | 10,100 |
| 2 | ZS | ASSOCIATES | INV | R5291 | USD | 2,000 |
| 3 | ZS | ASSOCIATES | INV | R5292 | USD | 4,000 |
| 4 | ZS | ASSOCIATES | INV | R5293 | USD | 8,000 |

[PREVIOUS] [NEXT]

REFORMAT REMITTANCE INFORMATION

YOU CAN SAVE THE CHANGES YOU MADE TO THE REMITTANCE INFORMATION AND APPLY TO ANY FUTURE ACH PAYMENTS FROM THIS PAYER

PAYER PROFILE: SUPPLIES NORTH
PAYER NAME: SUPPLIES NORTH INC.

SAVE ACH REFORMATTING RULE ◯ APPLY THESE FORMATTING CHANGES TO ALL ACH PAYMENTS FROM PAYER
◯ ONE TIME REFORMAT ONLY

[PREVIOUS] [SAVE] [CANCEL]

| Company Name | Ignore | Invoice Number | Ignore | Invoice Amount |
|---|---|---|---|---|
| ZS ASSOCIATES | INV | R5290 | USD | 10,100 |
| ZS ASSOCIATES | INV | R5291 | USD | 2,000 |
| ZS ASSOCIATES | INV | R5292 | USD | 4,000 |
| ZS ASSOCIATES | INV | R5293 | USD | 8,002 |

DATA FIELD TRANSACTION REPAIR INTERFACE

TECHNICAL FIELD

Embodiments described herein generally relate to reformatting data files and in particular, but not by way limitation, to a data field transaction repair interface.

BACKGROUND

Conforming data to a specific electronic data format can be a difficult technical challenge. This may especially be true when the electronic data format contains variable length fields, optional fields vs mandatory fields, and can extend for over 10,000 lines. Thus, it is easy to make a mistake such that a file fails to conform to the specific data format and is unusable for its intended purpose.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIGS. 4-8 illustrate user interfaces for generating a reformatting rule, according to various examples;

DETAILED DESCRIPTION

Conforming data to a specific electronic data format can be a difficult technical challenge. This may especially be true when the electronic data format contains variable length fields, optional fields vs mandatory fields, and can extend for over 10,000 lines. Thus, it is easy to make a mistake such that a file fails to conform to the specific data format and is unusable for its intended purpose. For example, consider the situation where the electronic data format is for a payment and payment information (e.g., invoice numbers, user accounts numbers, amount paid) associated with a recently completed payment—if the data is not formatted correctly, the payment information may not be processed correctly and lead to errors with a customer's account.

For example, the payment information received with the payment may be dropped the customer's account receivable application or included in an error report. The result may be that, even though the payment was processed, the customer may not be able to apply the payment to their accounts receivable application. The payment may then have to be researched and manually applied to a provider of the accounts receivable application. Thus, the payment information may end up in a suspended/suspect state or unapplied cash account maintained by the customer.

Companies often use software (e.g., an accounts receivable application) to help manage collecting receivable information. The software may service a number of customers (e.g., individuals, companies, etc.) and receive a customer data file that includes payment data to the customer from other businesses for many invoices at a time. Often, this data file fails to meet the strict formatting requirement to be processed such that the customer may receive information about the payment so that the payment can be applied to an accounts receivables application associated with the company.

In various examples described here, a system is described to process a malformed data file, model the data file, receive input on the model, and reformat the data file and submit it for further processing. Furthermore, a rule may be created based on how the data was reformatted to alleviate the need for customer input in the future. Accordingly, through an iterative process, many previously unusable portions of electronic data files may be automatically reformatted or repaired.

Figure 1:
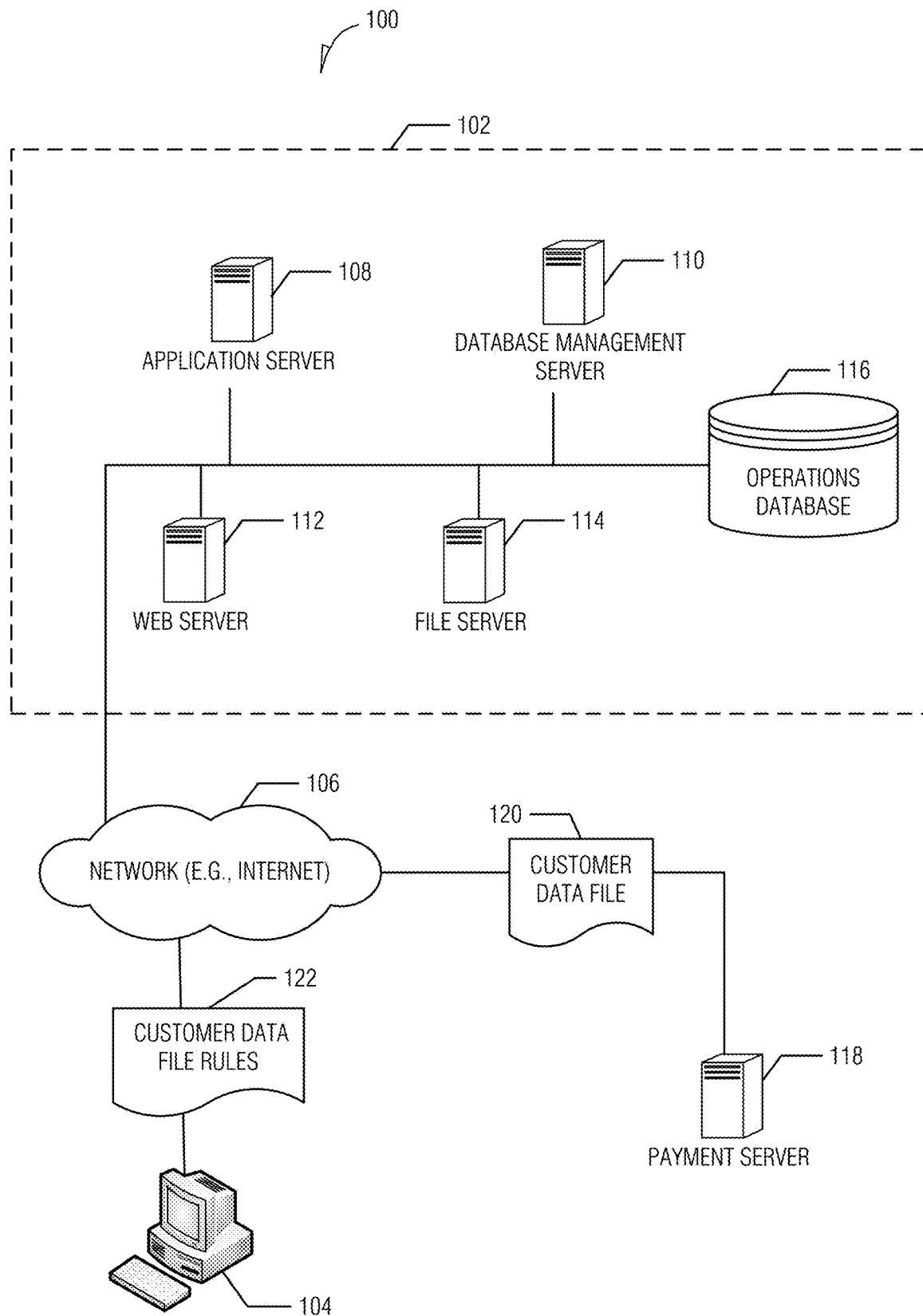
FIG. 1. illustrates a schematic diagram of a system, according to various examples.

FIG. 1 illustrates a schematic diagram 100 of system 102. System 102 is illustrated as including application server 108, database management server (DBMS 110), web server 112, file server 114, and operations database 116. System 102 may communicate with at least one computing device 104 via the network 106. Types of computing devices may include cell phone devices, desktop computing devices, tablet devices, etc., that include at least one processor, display device, and input device.

Although the system 102 is illustrated as a combination of application server 108, DBMS 110, web server 112, file server 114, and database 116, the system 102 may be made up of additional or fewer components. For example, the database 116 may be part of DBMS 110, or the functionality of the web server 112 and application server 108 may be performed by a single server without departing from the scope of this disclosure. Furthermore, the components of the system 102 may be in a single geographic location or in a diverse set of locations.

In various examples, the servers and components of the diagram 100 may communicate via one or more networks such as the network 106. The network 106 may include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 106 may include a single local area network (LAN) or wide-area network (WAN), or combinations of LAN's or WAN's, such as the Internet.

Data used in the system 102 may be organized and stored in a variety of manners. For convenience, the organized collection of data is described herein as the database 116. The specific storage layout and model used in database 116 may take a number of forms—indeed, database 116 may utilize multiple models. The database 116 may be, but is not limited to, a relational database (e.g., SQL), non-relational database (NoSQL) a flat file database, object model, document details model, or a file system hierarchy. The database 116 may store data on one or more storage devices (e.g., a hard disk, random access memory (RAM), etc.). The storage devices may be in standalone arrays, part of one or more servers, and may be located in one or more geographic areas.

The system 102, may be provided by an entity to facilitate payment record keeping of payments made to a customer from payers. For example, system 102 may be provided by a bank to help manage accounts receivable collection for its customers. User interfaces may be provided by the system 102 to the computing device 104 from the web server 112 for display on the display device of the computing device 104. A user of the computing device 104 may interact with elements of the user interface (e.g., active an upload button) to examine data in a customer data file 120 concerning remittance information of one or more payers. The user interfaces may be focused on validating or reformatting the remittance information in the data files provided by the customer (or other sources such as a payment processor). These user interfaces will be discussed in further detail herein with reference to FIGS. 4-8.

In various examples, the system 102 receives a customer data file 120 from the payment server 118 (e.g., ACH operator or money transfer network such as FED, CHIPS, or SWIFT); however, the customer data file 120 may be received from other sources as well. The customer data file 120 may be a file that contains information associated with payments paid the customer (e.g., information associated with the customer's customers). The customer data file 120 may include multiple payers and multiple invoices associated with the payers. The customer data file 120 may include payment processing information that was used to transfer money from one account to another (e.g., to effect payment) in addition to addenda information that includes remittance information that may be in free form or structured (but fail to conform to a valid standard format).

Figure 2:
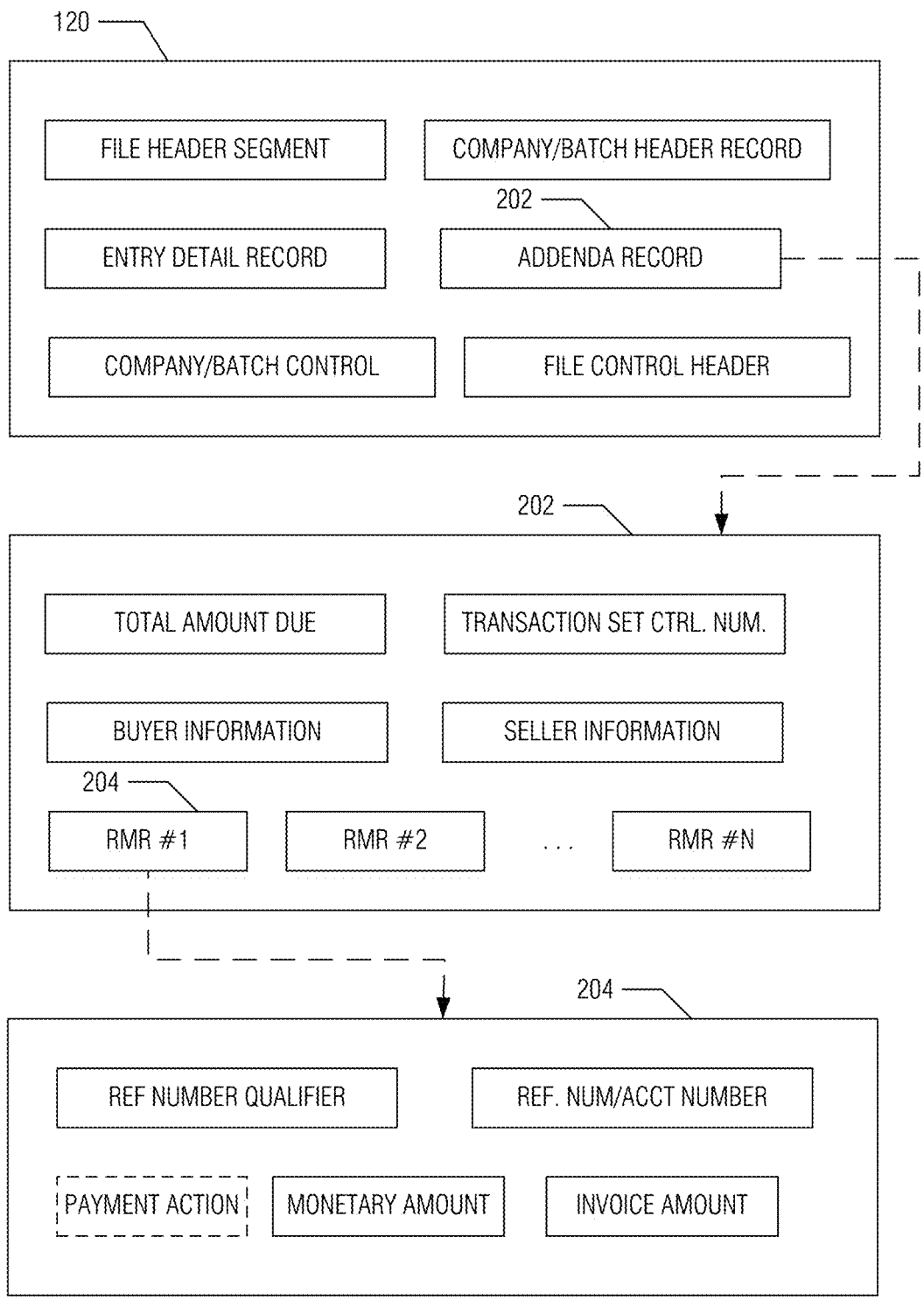
FIG. 2 illustrates a logical construction of a customer data file, according to various examples.

FIG. 2 illustrates a logical construction of the customer data file 120, according to an example embodiment. Although FIG. 2 describes a specific valid format, other formats may be used without departing from the scope of this disclosure. Furthermore, despite FIG. 2 illustrating a data file in a valid format, much of the disclosure focuses on processing of customer data files that fail to conform to such a format. The format of FIG. 2 may correspond to EDI ANSI X12 for an Automated Clearing House (ACH) transaction and specifically to a CTX type of ACH transaction. As illustrated, the customer data file 120 includes a file header segment, a company/batch header record, entry detail record 202, addenda record, company/batch control header, and a file control header. In the case of wire transfers, there may be originator to beneficiary instructions in freeform. In such cases, the processes described herein may translate the freeform text into a format usable by an accounts receivable application.

The entry detail record 202 may further be made up of a total amount due, a transaction set control number, buyer information, seller information, and remittance record 204 (as well more optional remittance records). Furthermore, a remittance record such as remittance record 204 may include a reference number qualifier (e.g., an invoice number), a reference number/account number, an optional payment action, a monetary amount, and an invoice amount.

The components of the system 102 may collectively respond to receipt of the customer data file 120 from the payment server 118. For example, web server 112 may communicate with file server 114 to publish or serve files stored on file server 114. Web server 112 may also communicate or interface with the application server 108 to enable web-based, mobile, or hybrid applications and presentation of information related to the customer data file 120. The application server 108 may consist of scripts, applications, or library files that provide primary or auxiliary functionality to the web server 112 (e.g., multimedia, file transfer, or dynamic interface functions). Applications may include code, which when executed by one or more processors, parse the customer data file 120, present user interfaces on the computing device 104 to generate or confirm customer data files rules 122 for reformatting the customer data file 120, and process the reformatted data file (e.g., apply the remittance information of the customer to their account by updating database 116).

Figure 3:
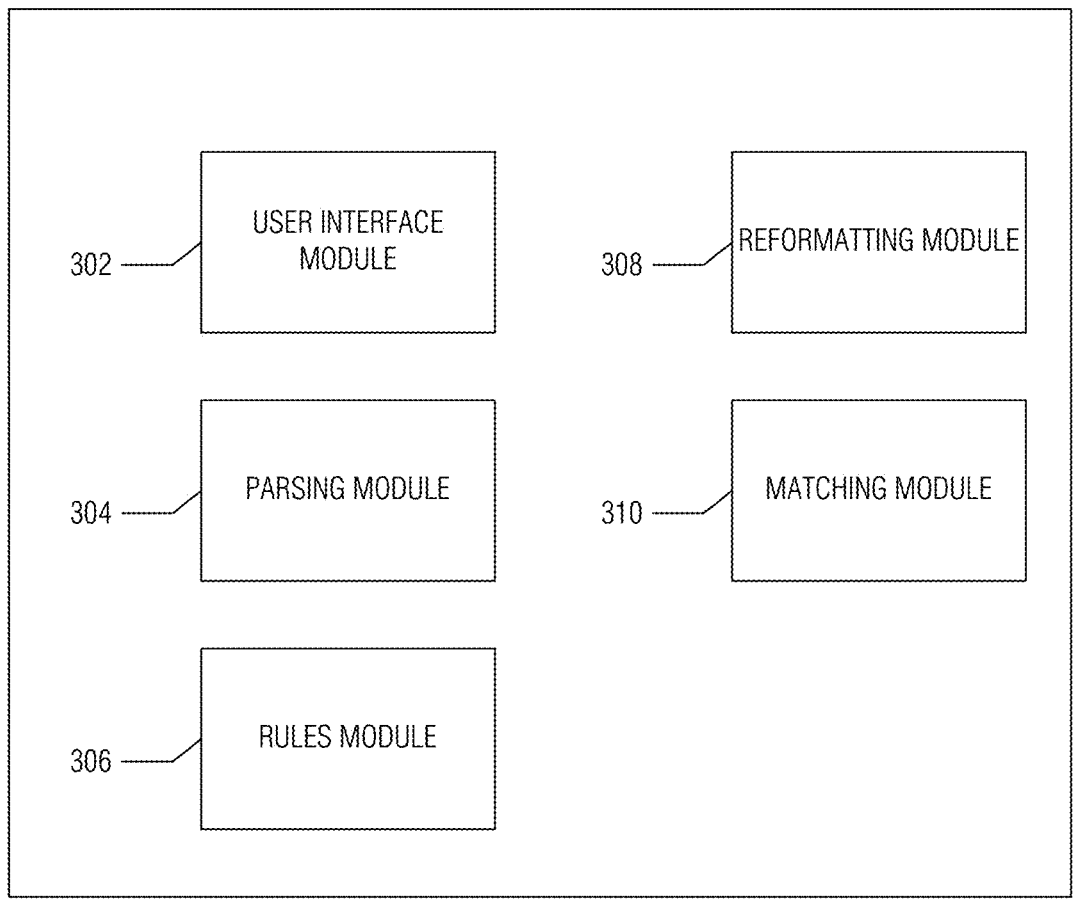
FIG. 3 illustrates a block diagram of a reformatting system, according to various examples.

FIG. 3 illustrates a block diagram of a reformatting system (e.g., such as system 102). The components include user interface module 302, parsing module 304, rules module 306, reformatting module 308, and matching module 310. These components may reside in one or more of the servers illustrated in system 102. Furthermore, the functionality of the components may be split across multiple servers and multiple geographic locations.

User interface module 302 may present one or more user interfaces on the computing device 104 to facilitate interaction with the data included in the customer data file 120. The parsing module 304 may analyze the customer data file 120 determine if the remittance information in the customer data file 120 is in a valid format for applying to an account of the customer in the accounts receivable application. The rules module 306 may be used in conjunction with the reformatting module 308 and matching module 310 to modify or extract information in the customer data file 120 to a processable format according to a new rule or a previous rule.

To help walk through the various user interfaces in the following figures and modules, a brief overview of how payments may be made between a buyer (e.g., a payer) and seller is briefly discussed. Specifically, the scenario will be one in which there are transactions between businesses as opposed to an individual. First, a buyer may order a set of goods from a seller (e.g., the customer in this document). In response the seller may provide an invoice back to the buyer. Then, buyer may respond with a payment order that includes remittance information for that invoice as well as potentially many other invoices. A set of invoices may be considered a batch. The payment order may be transmitted to a financial institution of the buyer such as system 102. The payment order may instead, or in addition to, be transmitted to a server of the buyer.

The payment orders may be provided in a variety of formats to the system 102 through various money transfer networks described above. This is despite the fact that the customer may request that the payment order be in a standardized format according to ACH rules. For example, an addenda record may be misplaced, use incorrect delimiters, fail to begin with the correct header information, or variety of other errors that would prevent the order from being properly processed by the accounts receivable application used by the customer. Consider the following segment of data which is formatted correctly according to a CTX type of ACH transaction with sample data:

ISA*00*  *00*  *ZZ*BANK  *ZZ*TEST  820*
999999*125
9*U*00401*000000004*0*T*~\GS*RA*BANK*
TEST  820*99999999*9999*5*X*004010\ST*820*
000000012\BPR*C*5781.11*C*ACH*CTX*01*
000000000*DA*  000000000*0000000000**01*
000000000*DA*ACCOUNT  #*
12345678*VEN\REF*72*XXXXXXX\REF*TN*
111111111111111*AC HAS SIGNED TRACE
NUMBER\DTM*044*999999\N1*PE*TEST
CUSTOMER*FI*888888888\N1*PR*TEST

ORIGINATOR\ENT*1\RMR*IV*555555555*
ER*5700.00*5700.00*0.0 0\REF*ST*096*STORE
NUMB ER\DTM*12345678\ENT*1\RMR*
IV*
444444444*ER*81.11*81.11*0.0
0\REF*ST*097*STORE NUMB ER\DTM*
12345678\SE*16*000000012\GE*1*5\IEA*1*
000000004\

As can be seen, there is a great deal of data that may be easily formatted incorrectly by a payer. A payment order may be further broken down into a variety of segments (such as described in FIG. 2). Thus, the segment of "ENT* 1\RMR*IV*555555555*ER*5700.00*5700.00*0.00\ REF*ST*096*STO RE NUMB ER\DTM*12345678\" may be considered the remittance information for an invoice. The remittance information itself may be broken down into a series of data fields. Thus, the "ENT*1" may be considered an entry beginning marker for a set of remittance information. Then, the marker "RMR*" may signify the beginning of an entry of remittance information. There may be multiple entries remittance information for a single "ENT*1."

In some instances, the payer fails to include information beyond remittance information. For example, the payer may provide a data file formatted as follows:
RMR*IV*555555555*ER*5700.00*5700.00*0.00\
RMR*IV*444444444*ER*81.11*81.11*0.00\

In other examples, a payer may not even transmit the remittance information in the required format, but instead provides addenda data in columns such as the following:
INVOICE 555555555 INV AMT 5700.00 AMT PD 5700.00
INVOICE 555555511 INV AMT 1200.00 AMT PD 1200.00
INVOICE 555555522 INV AMT 1000.00 AMT PD 1000.00

FIG. 4 is a user interface 402 that may be presented to the user after the customer data file 120 is received by the system 102 and analyzed by the parsing module 304. The system 102 may receive many data files for a single customer (e.g., from multiple payers). In some instances, a selector user interface is presented before user interface 402 to select a specific data file. The selector interface may include an indication that the specific data file could not be validated against a known format and is therefore improper.

The user interface 402 includes column 404 through column 414 that correspond to data fields detected in the customer data file 120 by the parsing module 304. As described above, the customer data file 120 may be in a format is improper according to a defined format. Thus, parsing module 304 may utilize a variety of techniques to extract the relevant remittance information if it is determined the customer data file 120 is invalid.

The parsing module 304 may compare the format of the customer data file 120 to one or more existing formats and parse data that fails to conform to the existing formats. The existing formats may be standard formats for payment processing or an XML format. These formats may include but are not limited to electronic data interchange formats such as X12, EDIFACT, and ODETTE. The process described herein is not limited to payment formats and may be used for reformatting rules of other defined formats as well.

Each format may have rules associated with it that should be followed to be properly read and utilized by various programs (such as an accounts receivable application). The rules may include but are not limited to sequence of segments, length of segments, and delimiters between the segments. The rules may be stored in the database 116. The parsing module 304 may iterate through the existing formats to see if a match can be made. A match may be considered made if the parsing module 304 makes it to the end of the data file and all of the rules of the format have been met. In an example, the entire data file does not need to be in the correct format for processing—such as when the remittance information is correct, but other portions of the file are incorrect.

Additionally, even if the parsing module 304 cannot match the data file to a defined standard format, it may be matched to a previously received format. As rules are created and stored in the database 116, non-standard format may be recognized. For example, one payer may consistently use '~' as a delimiter. After a rule is created for the payer, if parsing module 304 detects '~' where '*' should be, the previously stored reformatting rules may be applied. A payer may also be identified by looking (e.g., parsing) for the name of the payer in the customer file itself.

If a match cannot be made, the parsing module 304 may attempt to retrieve remittance information from the data file. One technique may be to look for known markers associated with remittance information. For example, consider the following portion of a data file:
20070621\RMR*IV*444444444*ER*81.11*81.11* 0.00\REF*ST*097*S TORE NUMBER\DTM*20070 621\ENT*1\

The data file would fail to conform to a defined format because the beginning marker "ENT*1" is placed after the remittance information. However, the remittance information is still included in the data file and may be found be looking for the sequence of characters "RMR." Accordingly, as will be discussed further, a rule may be generated that ignores the improper ENT placement and retrieves the remittance information. The rule may also reformat the remittance information if needed. In other words, a rule may indicate which information to ignore in a data file as well as changing the order of information, adding line breaks, etc.

As described above, a payer may provide a data file with just the remittance information, albeit in the correct format, but no other information. This style of data file would also fail, but may be curable by a rule that adds the other necessary segments required (e.g., the other segments illustrated in FIG. 2). In another example, the data file may have the correct markers, but use the wrong delimiters (e.g., ';' instead of '*' in the examples above.)

Further techniques may be used if no known markers are found such as looking for blocks of repetitive text in the data file. The blocks may be found by counting the number of characters that are repeated in the document and seeing if they are repeated after a certain number of delimiters. Consider the following set of data "INVOICE 555555555 INV AMT 5700.00 AMT PD 5700.00 INVOICE 555555511 INV AMT 1200.00 AMT PD 1200.00 INVOICE 555555522 INV AMT 1000.00 AMT PD 1000.00" The parsing module 304 may see that "INVOICE" is following by seven space delimited fields before repeating. Thus, the parsing module 304 may determine there is a set of eight total fields that are being repeated. In some instances, the data field may include a series of entries, one per line. Accordingly, the parsing module 304 may determine the number of fields based on the number of character segments per line. In another example, the information may be organized as columns. Thus, the parsing module may detect the repetitive blocks based on newline characters.

Accordingly, with reference back to FIG. 4, the user interface 402 may be shown using user interface module 302 after the parsing module 304 has determined perceived remittance information. In some instances, the parsing module 304 may be unable to process the data file and find information that may be remittance information. In these instances, the user interface 402 may present a message to a user requesting the remittance information be requested from the payers directly. The user may be associated with the customer or associated with the system 102. The user interface 402 may be presented on the computing device 104.

The user interface 402 may be presented to the user to allow the user to confirm that parsing module 304 has correctly parsed the customer data file 120. If the user sees something that looks incorrect, the user may activate (e.g., via an input device, voice command, touch input, etc.) edit table rules element 416. Upon activating the edit table rules element 416, an indication (e.g., an HTTP message, etc.) may be transmitted to the system 102. Upon receiving the indication, FIG. 5 may be presented.

FIG. 5 is a user interface 500 for receiving formatting information from a user, according to an example embodiment. The user interface 500 includes questions based on the unedited remittance information 512. While the questions are presented and discussed in a specific order, other orders or phraseology may be used without departing from the scope of the disclosure. The first question presented may be header setting 502 that requests information on whether or not the unedited remittance information 512 includes headers or labels. The second question, footer setting 504 may ask whether or not there are footers or totals in the unedited remittance information 512.

The next question, number setting 506, may request information on the number of pieces remittance information that are present in the unedited remittance information 512. If the user indicates that there is more than one, lines setting 508 may be enabled. The user may use a drop-down—or other UI element—to indicate the number of lines each piece of remittance information takes up in unedited remittance information 512. Another question, format setting 510, may be used to indicate the delimiter character(s) used between fields in the unedited remittance information 512 and/or if the fields are a fixed length.

Upon entering in the information into user interface 500, the system 102 may process the customer data file 120 as indicated by the settings into a set of data fields. For example, if the user indicates that there are two line per piece of remittance information the system 102 may take merge the first and second lines, third and fourth lines, etc. Similarly, if format setting 510 indicates that the delimiter is a '*' then each the customer data file 120 may be broken into data fields between occurrence of a '*.'

After the system 102 has processes the customer data file 120 according to the settings, the user interface module 302 may present another user interface, such as user interface 600 in FIG. 6. The user interface 600 illustrates the separation of the customer data file 120 into columns (e.g., data fields) in the parsed data file 602 according to the settings of user interface 500. The user interface 600 also includes column separator settings 604 and column settings 606 that may be used to separate a column into two or more other columns.

As an illustration, consider that the customer data file 120 is formatted with more than one delimiter: "FIELD1*FIELD2;FIELD3*FIELD4." The parsed data file 602 may only show three columns if '*' is used as the delimiter. Using column separator settings 604 and column settings 606 the user may break up "FIELD2;FIELD3" into two columns. Combine columns element 608 may be activated to present another user interface to combine columns. Thus, settings may be presented to combine the first two columns of parsed data file 602. This may be useful when the name of a payer is separated by spaces and the delimiter is also a space.

Continuing, the system 102 may process the parsed data file 602 according to the column separation and column combination settings. After processing, a user interface such as user interface 700 in FIG. 7 may be presented. The user interface 700 may allow the user to label the fields of the customer data file 120—as modified by the previous user interface settings—as they relate to remittance information. For example, not all of the information in the customer data file 120 may be needed for processing by the accounts receivable application—processing may include updating entries related to the customer with respect to a payer to show that a payment has been made.

As different file formats require different sets of information, the system 102 may utilize profiles stored in database 116. User interface 700 includes a field profile setting 702 for selecting a profile relevant to the type of format. The field profile setting 702 may retrieve the labels needed for processing by an application (accounts receivable or otherwise). Thus, for one customer, the profile may include labels for "Company Name," "Invoice Number," and "Invoice Amount." The user may then use field label settings 704 to label the columns using the drop-down menus of the user interface 700. If a column is not need it may be labeled as "Ignore."

FIG. 8 illustrates a user interface 800 that may be presented to a user after the user labels the columns in user interface 700. User interface 800 includes reformatting rule setting 802 and reformatting preview 804. The reformatting rule setting 802 may detail how reformatting of data files from the same payer for the customer occurs in the future. For example, using reformatting rule setting 802 the user may indicate that all future data files from the payer should be reformatted according to the settings entered in the prior user interfaces. A preview of the reformatting and labels of relevant columns may be presented as reformatting preview 804. The payer may be identified in the customer data file 120 or by the customer when the customer data file 120 is transmitted to the system 102. The user may also choose to only apply the reformatting just once.

When the user indicates to apply the rule to the payer in the future, a rule entry in the database 116 may be stored. The rule entry may include identification of the payer and one or more of column combination settings, column separation settings, delimiter settings, number of lines per remittance piece, header information, and footer information. The value of the variables in the rule entry may be set according to what the user entered into the user interfaces 400, 500, 600, and 700.

In various examples, the system 102 may generate a global rule for the payer. Thus, if the payer is common across multiple customers, the rule entry for the payer for customer A may also be used for data files that include the payer for Customer B.

Figure 9:
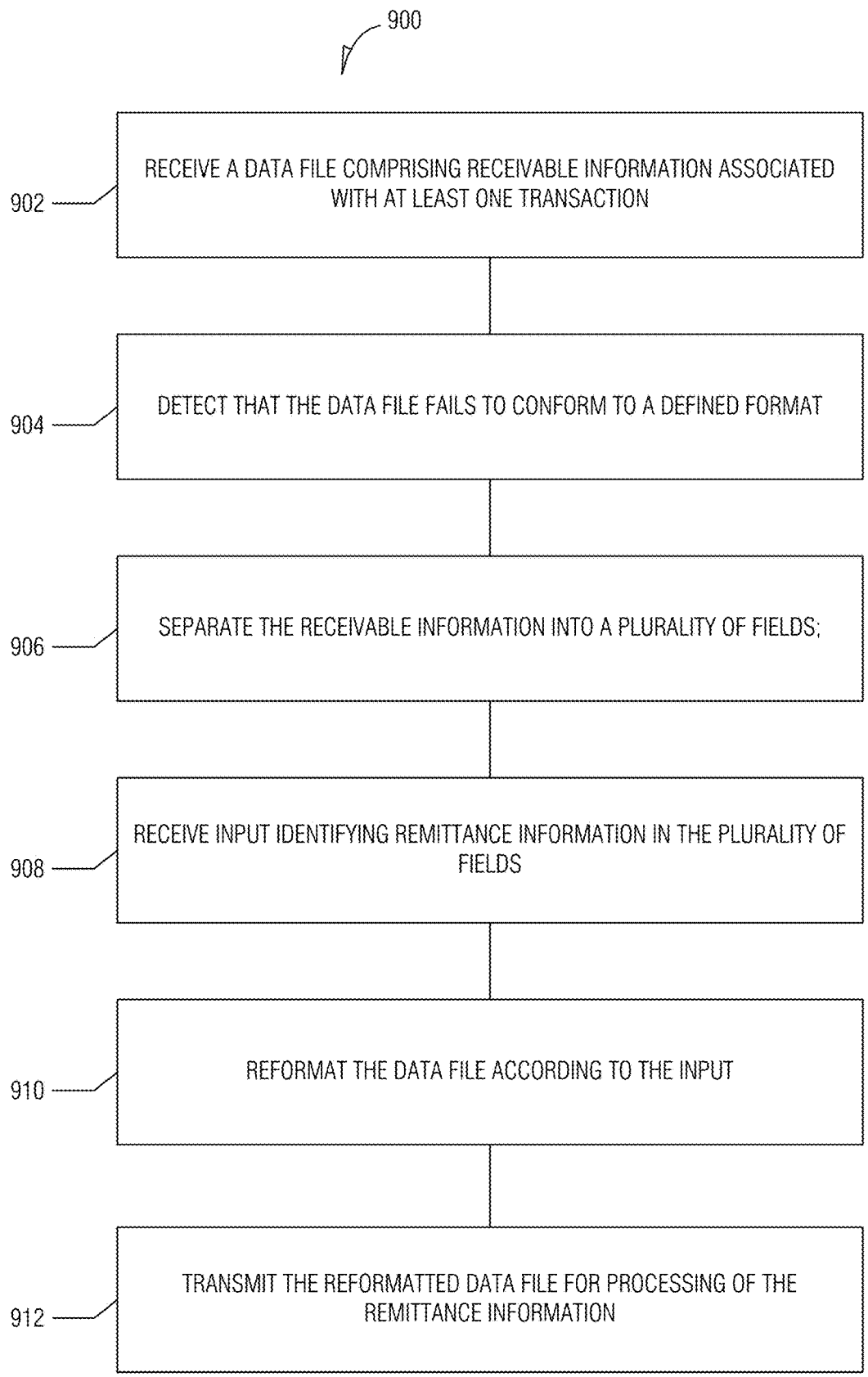
FIG. 9 illustrates a method to reformat a data file, according to various examples.

FIG. 9 illustrates a method 900 to reformat a data file. The method 900 may be performed by any of the modules, layers, logic, or components described herein. At block 902, a data file comprising receivable information associated with a transaction is received. The data file may be received at a system for processing of the data file via network such as the Internet. The data file may be uploaded via user interface after a user has logged in to a web application. The lease one transaction may be associated with an invoice issued from seller to a buyer.

At block 904, in an example, it is detected that the data file fails to conform to a defined format. The format may be a format associated with electronic payments. The format may be defined according to a series of data fields. Groupings of data fields may be considered a segment. There may be rules associated with the length of the data fields, the order of the data fields, the length of the segments, the order of the segments, and delimiters between the segments and data fields. If the rules are not followed, the data file may be considered to have failed to conform to the format. Thus, if it is detected that a delimiter for the defined format is not present in the data file, it will have failed.

At block 906, in an example, the receivable information the separated into a plurality of fields. Separating may include parsing the data file to extract perceived remittance information for the transaction. Perceive remittance information may be detected by looking for beginning marker for remittance information according to the defined format.

The user interface may be presented that includes identification of the perceived remittance information within the plurality of fields. At block 908, in an example, input is received that identifies remittance information in the plurality of fields. The input may label at least one of the plurality of fields as the remittance information. This may include labeling the perceived remittance information as actual remittance information.

At block 910, in an example, the data file may be reformatted according to the input. The result of the reformatting may be a reformatted data file. Reformatting may include joining one or more of the plurality of data fields or separating a data field into multiple columns. Reformatting may also include changing delimiters according to the defined format. Thus, reformatting may be a combination of user input identifying the remittance information and using the known requirements of the data format.

The reformatting rules (e.g., a combination of the user input and requirements) may be stored for future use. The rule may be limited to the customer (e.g., the seller) or be expanded to be a global rule. The rule may also be associated with the payer. Thus, if another data file is received that includes remittance information associated with the payer, the rule may be applied without the need for additional user input. Similarly, it may be determined that the another received data file is in the format as the original received data file and the same rule may be applied. A confirmation user interface element may be presented to apply the rule, in some examples.

A method which use a preexisting rule may include receiving a first data file comprising receivable information associated with at least one transaction. Then it may be detected that the first data file fails to conform to a defined format (e.g., a CTX format). Based on the detecting, the format of the first data file may be matched to a known format of a second data file. The second file may have been previously received or a rule entry may have proactively been created or stored for known improper formats. A reformatting rule for the format of the second data file may be retrieved and then the first data file may be reformatted according to the reformatting rule.

At block 912, in an example, the reformatted data file may be transmitted for processing of the remittance information. Transmission may occur from the same system that received the data file or from another system. The receiving system may service an accounts receivable application which may use the data to update account balances of a customer as well as update the paid status of invoices for the customer.

Figure 10:
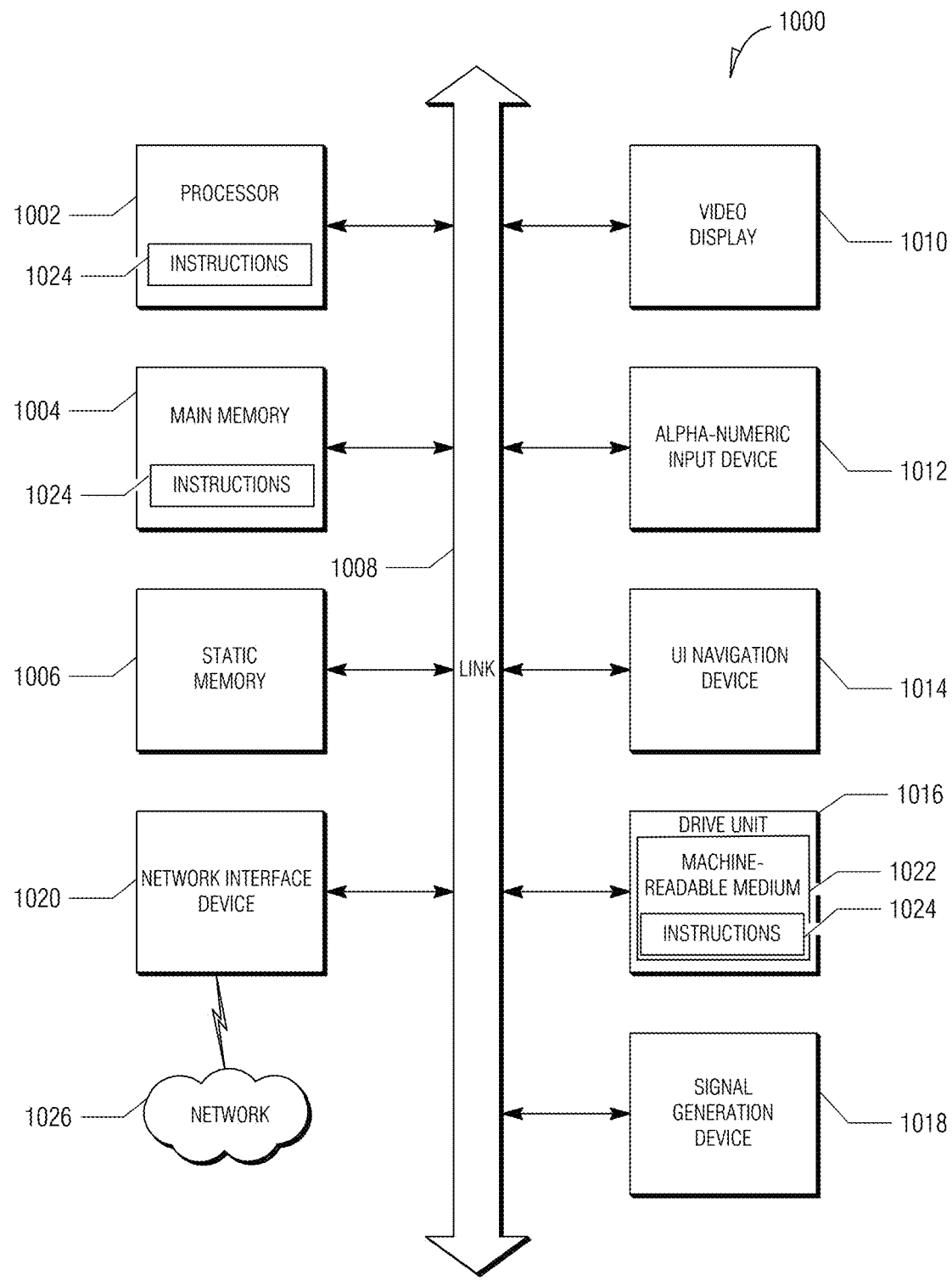
FIG. 10 is a block diagram of a machine in the example form of a computer system within which a set of instructions, for causing the machine to perform any one or more of the methodologies discussed herein, may be executed.

FIG. 10 is a block diagram illustrating a machine in the example form of a computer system 1000, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via a link 1008 (e.g., bus). The computer system 1000 may further include a video display unit 1010, an alphanumeric input device 1012 (e.g., a keyboard), and a user interface (UI) navigation device 1014 (e.g., a mouse). In one embodiment, the video display unit 1010, input device 1012 and UI navigation device 1014 are incorporated into a touch screen display. The computer system 1000 may additionally include a storage device 1016 (e.g., a drive unit), a signal generation device 1018 (e.g., a speaker), a network interface device 1020, and one or more sensors (not shown), such as a global positioning system (GPS) sensor, compass, accelerometer, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example embodiment to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   receiving, at a computer device with at least one processor, a data file comprising receivable information associated with at least one auction clearing house (ACH) transaction;
   detecting, by the at least one processor, that the data file fails to conform to an ACH standardized defined data format;
   in response to the detecting, separating, by the at least one processor, the receivable information into a plurality of fields, the separating including parsing the data file to extract perceived remittance information for the at least one transaction;
   presenting a first user interface including:
      a first table with a plurality of columns, each column of the plurality of columns corresponding to one of the plurality of fields, and wherein a row of the table includes the perceived remittance information from a transaction of the at least one transaction that fails to conform to the ACH standardized defined data format; and
      a confirmation user interface element to indicate whether or not the perceived remittance information has been parsed corrected;
   receiving, from a user via the first user interface, an indication that the perceived remittance information has not been parsed correctly;
   in response to the indication, presenting a second user interface, the second user interface including requests for configuration characteristics of the data file and labels for one or more of the plurality of fields;
   after the second user interface, presenting a third user interface, the third user interface including a second table, the second table including a preview of the data file as reformatted according to input by the user via the second user interface;
   receiving, via the third user interface, input to save a rule for reformatting the data file according to the input;
   reformatting, by the at least one processor, the data file according to the rule into a reformatted data file; and
   transmitting the reformatted data file for processing.

2. The method of claim 1, wherein parsing the data file to extract perceived remittance information for the transaction includes:
   parsing the data file to detect a beginning marker for remittance information for the at least one transaction.

3. The method of claim 1, wherein detecting that the data file fails to conform to the defined data format comprises:
   detecting that a delimiter for the defined data format is not present in the data file.

4. The method of claim 1, wherein the data file is associated with an entity and wherein the method further comprises:
   receiving another data file from the entity;
   determining, by the at least one processor, the another data file is in the format as the received data file; and
   reformatting the another data file according to the rule.

5. A non-transitory computer-readable storage medium, the computer-readable storage medium including instructions that when executed by a computer, cause the computer to perform operations of:
   receiving a data file comprising receivable information associated with at least one auction clearing house (ACH) transaction;
   detecting that the data file fails to conform to an ACH standardized defined data format;
   in response to the detecting, separating the receivable information into a plurality of fields,
   the separating including parsing the data file to extract perceived remittance information for the at least one transaction;
   presenting a first user interface including:
      a first table with a plurality of columns, each column of the plurality of columns corresponding to one of the plurality of fields, and wherein a row of the table includes the perceived remittance information from a transaction of the at least one transaction that fails to conform to the ACH standardized defined data format; and
      a confirmation user interface element to indicate whether or not the perceived remittance information has been parsed corrected;
   receiving, from a user via the first user interface, an indication that the perceived remittance information has not been parsed correctly;
   in response to the indication, presenting a second user interface, the second user interface including requests for configuration characteristics of the data file and labels for one or more of the plurality of fields;

after the second user interface, presenting a third user interface, the third user interface including a second table, the second table including a preview of the data file as reformatted according to input by the user via the second user interface;

receiving, via the third user interface, input to save a rule for reformatting the data file according to the input;

reformatting the data file according to the rule into a reformatted data file; and transmitting the reformatted data file for processing.

6. The computer-readable storage medium of claim 5, wherein parsing the data file to extract perceived remittance information for the transaction includes:

parsing the data file to detect a beginning marker for remittance information for the at least one transaction.

7. The computer-readable storage medium of claim 5, wherein detecting that the data file fails to conform to the defined data format comprises:

detecting that a delimiter for the defined data format is not present in the data file.

8. The computer-readable storage medium of claim 5, wherein the data file is associated with an entity and wherein the operations further comprise:

receiving another data file from the entity;

determining the another data file is in the format as the received data file; and reformatting the another data file according to the rule.

9. A computing apparatus, the computing apparatus comprising:

a processor; and a memory storing instructions that, when executed by the processor, configure the processor to:

receive a data file comprising receivable information associated with at least one auction clearing house (ACH) transaction;

detect that the data file fails to conform to an ACH standardized defined data format;

in response to the detection, separate the receivable information into a plurality of fields by a parse of the data file to extract perceived remittance information for the at least one transaction;

present a first user interface including:

a first table with a plurality of columns, each column of the plurality of columns corresponding to one of the plurality of fields, and wherein a row of the table includes the perceived remittance information from a transaction of the at least one transaction that fails to conform to the ACH standardized defined data format; and a confirmation user interface element to indicate whether or not the perceived remittance information has been parsed corrected;

receive, from a user via the first user interface, an indication that the perceived remittance information has not been parsed correctly;

in response to the indication, present a second user interface, the second user interface including requests for configuration characteristics of the data file and labels for one or more of the plurality of fields;

after the second user interface, present a third user interface, the third user interface including a second table, the second table including a preview of the data file as reformatted according to input by the user via the second user interface;

receive input to save a rule for reformatting the data file according to the input;

reformat the data file according to the rule into a reformatted data file; and transmit the reformatted data file for processing.

10. The computing apparatus of claim 9, wherein to parse the data file to extract perceived remittance information for the transaction, the processor is configured to:

parse the data file to detect a beginning marker for remittance information for the at least one transaction.

11. The computing apparatus of claim 9, wherein the to detect that the data file fails to conform to the defined data format, the processor is configured to:

detect that a delimiter for the defined data format is not present in the data file.

12. The computing apparatus of claim 9, wherein the data file is associated with an entity and wherein the processor is further configured to:

receive another data file from the entity;

determine, by the at least one processor, the another data file is in the format as the received data file; and reformat the another data file according to the rule.

* * * * *